Figure 1:
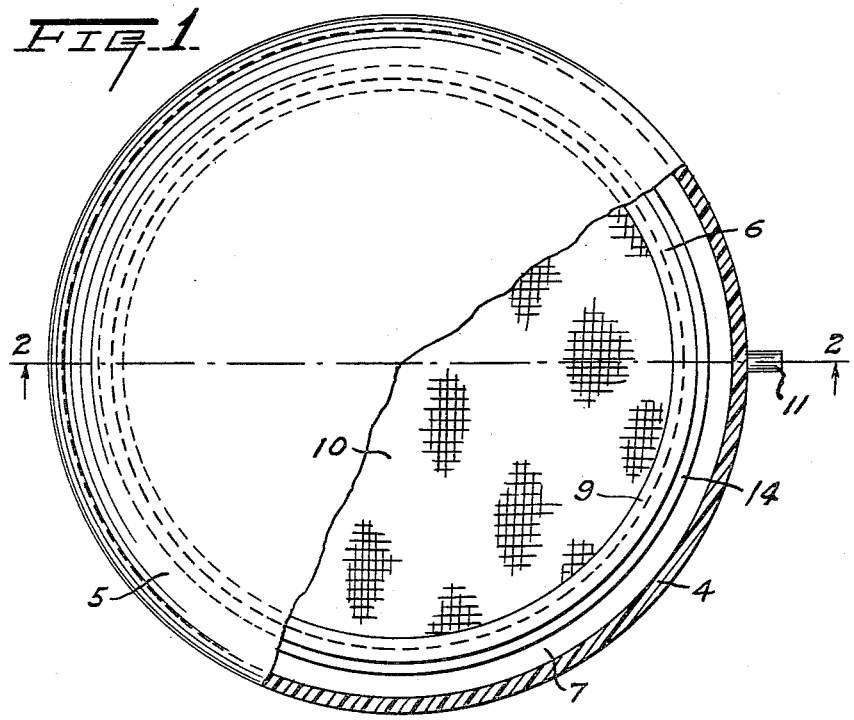

Jan. 21, 1958   S. LIGHTER   2,820,744
FLOATING SOLAR STILL
Filed Nov. 5, 1956

INVENTOR.
Stephen Lighter
BY
Lieber & Lieber
ATTORNEYS.

United States Patent Office 2,820,744
Patented Jan. 21, 1958

2,820,744

FLOATING SOLAR STILL

Stephen Lighter, Madison, Wis.

Application November 5, 1956, Serial No. 620,293

6 Claims. (Cl. 202—234)

The present invention relates in general to the art of converting polluted liquid into pure water, and it relates more specifically to improvements in the construction and operation of solar heat actuated stills for transforming sea water into wholesome drinking liquid.

The primary object of my invention is to provide a so-called solar still which is simple in construction and highly efficient in operation.

Many different kinds of devices for converting sea water into palatable drinking liquid have heretofore been proposed, and in some of these prior assemblages it has also been contemplated to utilize solar heat to effect the transformation. However, some of these prior converters have embodied complicated systems and mechanism for producing and removing the purified liquid, while others did not function automatically and required considerable attention in order to insure continuity of operation, and none of the previous solar still assemblages have proven entirely satisfactory primarily because of their bulk, cost, lack of reliability, and inefficiency.

It is therefore an important object of the present invention to provide a compact and automatically functioning solar still adapted to rapidly and effectively distill sea water or the like.

Another important object of this invention is to provide a buoyant seat water distilling unit adapted to most effectively utilize solar heat to continuously convert such water into palatable liquid while floating on the sea.

A further important object of the invention is to provide an improved sea water distilling device of relatively small size but of considerable output capacity especially adapted to ride upon the open sea and to produce and deliver pure drinking liquid without the aid of complicated condensing coils and other mechanism.

Still another important object of my invention is to provide an inexpensive but reliable solar still of maximum efficiency capable of being carried on life rafts and of floating upon sea water or the like while converting such water into potable liquid devoid of all impurities.

These and other more specific objects and advantages of the invention will be apparent from the following description.

A clear conception of the features constituting the present improvements, and of the construction and functioning of a solar still unit embodying the invention, may be had by referring to the drawing accompanying and forming a part of this specification wherein like reference characters designate the same or similar parts in the several views.

Figure 2:
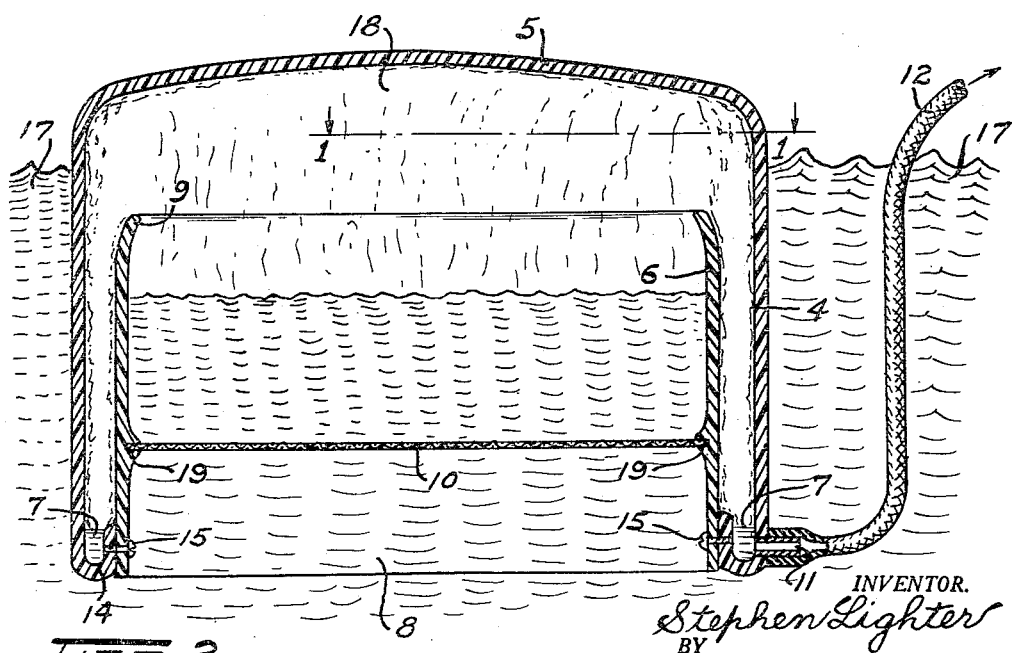

Fig. 1 is a part sectional top view of a typical solar still constructed in accordance with the invention, the section having been taken along the line 1—1 of Fig. 2; and Fig. 2 is a central vertical section through the same still unit, taken along the line 2—2 of Fig. 1, and showing the device in action.

While the invention has been illustrated and described herein as having been embodied in a buoyant solar actuated unit especially adapted for the distillation of sea water and equipped with means for preventing sea urchins and other impurities from entering the final product, it is not intended to restrict the improved features to such an assemblage; and it is also contemplated that specific descriptive terms employed herein be given the broadest possible interpretation consistent with the actual disclosure.

Referring to the drawing, the improved buoyant solar still illustrated comprises in general, an imperforate dome shaped outer casing having an annular upright side wall 4 spanned at its upper end by a top deck or enclosure 5; an inner upright annular wall 6 located within and spaced from the casing side wall 4 but coacting therewith to provide a deep upwardly open annular trough 7, the inner wall 6 having an unobstructed bottom opening 8 communicable with the ambient atmosphere and an upper unobstructed open end 9 spaced from the casing top enclosure 5; a liquid pervious barrier 10 spanning the interior of the inner wall 6; and an outlet nipple 11 for the trough 7 communicable with a receptacle for the distilled liquid through a flexible conduit 12.

The main casing and the inner wall 6 are preferably formed of relatively heavy and durable material such as transparent plastic or glass, and the side wall 4 of the casing may be provided with a lower inwardly directed integral flange 14 to which the lower end of the inner wall 6 may be detachably attached by means of screws 15 or the like in order to provide for cleaning access to the bottom of the trough 7. While the walls 4, 6 and trough 7 are shown as being truly circular, they may be of any other continuous shape, and the top deck or enclosure 5 of the casing may be formed integral with or separable from the side wall 4, and is preferably curved as shown in order to conduct and drain any condensate deposited thereon into the trough 7.

The liquid pervious barrier 10 shown comprises a fine screen capable of preventing animal life and other small particles in the sea water 17 in which the unit is normally floated, from entering the condensing space 18 beneath the casing top enclosure 5. This screen barrier 10 may be removably confined along its periphery, within an annular groove 19 in the inner wall 6, and the upper outer surface of the dome top enclosure 5 is preferably covered with a dark heat absorbing coating, while the inner surface of this enclosure 5 and the barrier screen 10 are preferably coated with heat reflective layers of aluminum or the like. The conduit 12 may be a flexible hose or the like sealingly attached to the nipple so as to prevent free access of ambient air to the space 18, and this conduit 12 together with similar outlet conduits of several other like solar units, should have its outlet end immersed in liquid within the pure water receptacle so as to produce a siphoning effect.

When the improved solar still has been properly constructed and assembled as above described, one or more of the units depending upon the demand for pure distilled liquid required, may have their delivery conduits applied to a suitable receptacle, whereupon the individual units may be floated upon the open sea. As depicted in Fig. 2, each of the solar stills when floated, should be of sufficient heft and depth to cause the lower portions of the walls 4, 6 and of the trough 7 to be immersed to a considerable extent beneath the surface of the sea water 17. Upon being thus floated, sea water 17 will fill the space beneath the barrier 10 through the bottom opening of the inner wall 6, and filtered sea water devoid of solids and animal life will rise into the space within the inner wall 6 above the pervious barrier 10 to a level somewhat below the upper edge 9 of this inner wall, thereby hermetically sealing the space 18 and subjecting the air confined therein to hydrostatic pressure equivalent to the difference in head between the levels of the liquid surrounding the unit and that of the filtered liquid within the inner wall 6.

When a floating unit is subsequently subjected to the sun's rays, the dark coated outer surface of the top enclosure 5 will absorb considerable heat and the reflectively coated lower surface of the deck 5 together with the likewise coated barrier will reflect heat into the space 18 thereby evaporating liquid from within the inner wall 6 above the barrier 10. The vapor thus formed will condense upon contacting the inner dome surfaces and the outer surface of the inner wall 6 which are immersed within the cool sea water 17, and the condensate will accumulate within the trough 7 from which it may be constantly siphoned or otherwise withdrawn through the nipple 11 and conduit 12. The delivery of this fresh liquid from each unit is also materially aided by the hydrostatic pressure existing within the condensing space 18, and any impurities removed by distillation will gravitate back into the sea through the perforated barrier 10.

From the foregoing detailed description of the construction and functioning of the device, it should be apparent that the present invention in fact provides an efficient solar still for sea water which is extremely simple and compact in structure and automatic in operation. Since the condensing chamber or space 18 is hermetically sealed the air pressure within this chamber remains substantially constant, and no foreign matter can enter this sealed space and into the trough 7 due to the provision of the pervious or perforated barrier 10. The unit when floated provides ample surface exposed to cool condensing liquid, and the transparent walls 4, 6 and coated surfaces of the dome top 5 and of the barrier 10, insure most effective application of the available heat. The improved assemblage is devoid of all mechanism, and the various parts are conveniently separable for cleaning and inspection purposes and may be constructed at moderate cost. The unit is especially adapted for use on life rafts or the like, but may be manufactured in various sizes for diverse uses, and the still has proven highly satisfactory and successful for the distillation of brine into potable drinking water.

It should be understood that it is not desired to limit this invention to the exact details of construction and operation of the solar heated still herein specifically shown and described, for various modifications within the scope of the appended claims may occur to persons skilled in the art.

I claim:

1. In a solar still, an imperforate dome-shaped buoyant outer casing having a continuous side wall spanned at its upper end by a top enclosure, a continuous inner wall within said casing side wall and coacting therewith to provide an upwardly open trough between said walls, said inner wall having an open lower end communicating with the ambient atmosphere and an open upper end spaced from said top enclosure and communicating with said trough, and means for conducting liquid from within said trough.

2. In a solar still, an imperforate dome shaped buoyant outer casing having a continuous side wall spanned at its upper end by a top enclosure, a continuous inner wall within said casing side wall and coacting therewith to provide an upwardly open trough between said walls, said inner wall having an open lower end communicating with the ambient atmosphere and an open upper end spaced from said top enclosure and communicating with said trough, a liquid pervious barrier spanning the interior of said inner wall, and conduit means for conducting liquid from within said trough.

3. In a solar still, an imperforate dome shaped buoyant outer casing having a continuous annular side wall spanned at its upper end by an upwardly convex top enclosure, a continuous inner annular wall within said casing side wall and coacting therewith to provide an upwardly open trough between said walls, said inner wall having an unobstructed open lower end communicating with the ambient atmosphere and an unobstructed open upper end spaced from said top enclosure to form a condensing chamber communicating with said trough, and means for conducting liquid from within said trough.

4. In a solar still, an imperforate dome shaped buoyant outer casing having a continuous annular side wall spanned at its upper end by an upwardly convex top enclosure, a continuous inner annular wall within said casing side wall and coacting therewith to provide an upwardly open trough between said walls, said inner wall having an open lower end communicating with the ambient atmosphere and an open upper end spaced from said top enclosure to form a liquid sealed condensing chamber communicating with said trough, a liquid pervious barrier spanning the interior of said inner wall, and conduit means for conducting liquid from within said trough.

5. In a solar still, an imperforate dome shaped buoyant outer casing having a continuous side wall of considerable height spanned at its upper end by a heat absorbent top enclosure, a continuous inner wall within said casing side wall and coacting therewith to provide an upwardly open trough between said walls, said inner wall having an open lower end communicating with the ambient atmosphere and an open upper end spaced from said top enclosure to form a hermetically sealed condensing chamber communicating with said trough, and means for withdrawing liquid from within said trough.

6. In a solar still, an imperforate transparent dome shaped buoyant outer casing having a continuous side wall spanned at its upper end by an upwardly convex heat absorbent coated top enclosure, a continuous inner wall within said casing side wall and spaced therefrom to provide an upwardly open trough between said walls, said inner wall having an open lower end normally immersed in liquid and communicating with the ambient atmosphere and also having an open upper end spaced from said top enclosure to provide a sealed condensing chamber communicating with said trough, a liquid pervious barrier spanning the medial interior of said inner wall, and conduit means for conducting liquid from within said trough.

No references cited.